US011299435B2

(12) United States Patent
Colpaert et al.

(10) Patent No.: US 11,299,435 B2
(45) Date of Patent: Apr. 12, 2022

(54) UREA-BASED COMPOSITION AND METHOD FOR THE MANUFACTURE THEREOF

(71) Applicant: Yara International ASA, Oslo (NO)

(72) Inventors: Filip Colpaert, Zwijnaarde (BE); Ruud Van Belzen, Middelburg (NL)

(73) Assignee: Yara International ASA, Oslo (NO)

(*) Notice: Subject to any disclaimer, the term of this patent is extended or adjusted under 35 U.S.C. 154(b) by 247 days.

(21) Appl. No.: 16/480,442

(22) PCT Filed: Mar. 7, 2018

(86) PCT No.: PCT/EP2018/055563
§ 371 (c)(1),
(2) Date: Jul. 24, 2019

(87) PCT Pub. No.: WO2018/162533
PCT Pub. Date: Sep. 13, 2018

(65) Prior Publication Data
US 2021/0284586 A1 Sep. 16, 2021

(30) Foreign Application Priority Data

Mar. 7, 2017 (EP) ..................................... 17159702

(51) Int. Cl.
*C05C 9/00* (2006.01)
*C05G 3/90* (2020.01)
(Continued)

(52) U.S. Cl.
CPC ............ *C05C 9/005* (2013.01); *A23L 29/035* (2016.08); *A23L 29/045* (2016.08); *C05G 3/90* (2020.02); *C05G 5/30* (2020.02)

(58) Field of Classification Search
None
See application file for complete search history.

(56) References Cited

U.S. PATENT DOCUMENTS 7,700,012 B2* 4/2010 Van Der Werf ........... B01J 2/26
264/5
2012/0067094 A1* 3/2012 Pursell ..................... C05G 5/30
71/29
(Continued)

FOREIGN PATENT DOCUMENTS

DE 102009034433 A1 1/2011
WO 2016137815 A1 9/2016
(Continued)

OTHER PUBLICATIONS

Engel et al., "Degradation of the Urease Inhibitor NBPT as Affected by Soil pH," Soil Science Society of America Journal, vol. 79, Nov. 6, 2015, pp. 1674-1683.
(Continued)

*Primary Examiner* — Wayne A Langel
(74) *Attorney, Agent, or Firm* — Amster, Rothstein & Ebenstein LLP

(57) ABSTRACT

The invention relates to a solid, particulate, urea-based composition comprising urea in particulate form and a urease inhibitor of the type phosphoric triamide, in particular N-(n-butyl) thiophosphoric triamide (nBTPT), wherein the urea-based composition is further characterized in that it comprises one or more alkaline or alkaline-forming inorganic compounds. The composition according to the invention has been stabilized against the degradation of a urease inhibitor of the type phosphoric triamide, in particular N-(n-butyl) thiophosphoric triamide (nBTPT) in the presence of urea. The invention further relates to a method for the manufacture of the claimed solid, particulate, urea-based composition.

24 Claims, 5 Drawing Sheets

(51) Int. Cl.
   *C05G 5/30*   (2020.01)
   *A23L 29/00*   (2016.01)

(56) References Cited

U.S. PATENT DOCUMENTS

| | | |
|---|---|---|
| 2012/0096912 A1 | 4/2012 | Rizzo |
| 2014/0047883 A1 | 2/2014 | Gabrielson et al. |
| 2014/0047884 A1 | 2/2014 | Gabrielson et al. |
| 2017/0158575 A1* | 6/2017 | Schneider .............. C09K 15/26 |
| 2018/0044254 A1 | 2/2018 | Gabrielson et al. |

FOREIGN PATENT DOCUMENTS

| | | |
|---|---|---|
| WO | 2017013573 A1 | 1/2017 |
| WO | 2017081183 A1 | 5/2017 |

OTHER PUBLICATIONS

PCT International Search Report and Written Opinion dated Jun. 20, 2018 in connection with PCT International Application No. PCT/EP2018/055563.

PCT International second Written Opinion dated Feb. 1, 2019 in connection with PCT International Application No. PCT/EP2018/055563.

PCT International Preliminary Report on Patentability dated May 17, 2019 in connection with PCT International Application No. PCT/EP2018/055563.

* cited by examiner

UREA-BASED COMPOSITION AND METHOD FOR THE MANUFACTURE THEREOF

CROSS-REFERENCE TO RELATED APPLICATIONS

This application is a U.S. national stage entry under 35 U.S.C. § 371 of PCT International Patent Application No. PCT/EP2018/055563, filed Mar. 7, 2018, which claims priority to European Patent Application No. 17159702.4, filed Mar. 7, 2017, the contents of which are incorporated herein by reference in their entirety.

FIELD OF THE INVENTION

This invention relates to a solid, particulate, urea-based composition comprising urea in particulate form and a urease inhibitor of the type phosphoric triamide, in particular N-(n-butyl) thiophosphoric triamide (nBTPT), with improved properties, for reducing ammonia loss by urease activity in the soil. The invention further relates to a method for the manufacture of a solid, particulate urea-based composition comprising urea in particulate form and a urease inhibitor of the type phosphoric triamide, in particular N-(n-butyl) thiophosphoric triamide (nBTPT). The product is in particular suitable as a fertilizer.

BACKGROUND OF THE INVENTION

Urea is the most common nitrogen-containing fertilizer. Urea has the highest nitrogen content of all nitrogen-containing fertilizers in common use (46%). Its consumption worldwide has been considerably increased, from about 20 million tons in the early seventies to about 100 million tons at the beginning of the twenty first century. Nitrogen is a basic element for any living system as a constituent of protein.

Urea is often used as such, but also as a component of a particulate blend, i.e. a physical blend or bulk blend, containing additional (primary and secondary nutrient) elements, such as potassium, phosphor, nitrogen and sulphur to obtain a particulate NPK(S), NP(S) or NK(S) blend, and other elements such as magnesium and calcium (secondary nutrients). In that respect, urea can easily be blended with, for example, potassium sulphate (sulphate of potash, SOP) and potassium magnesium sulphate (sulphate of potash magnesia). Urea can also be blended with sodium nitrate (Chilean nitrate 16-0-0), ammonium sulphate (sulphate of ammonia), urea ammonium sulphate (UAS), mono ammonium phosphate (MAP), di-ammonium phosphate (DAP), rock phosphate, potassium chloride (muriate of potash, MOP) and urea calcium nitrate (UCAN).

Particulate urea can hardly be mixed and stored as a blend with certain chemicals due to hygroscopic double salt formation or release of crystal water but can be mixed, and co-applied shortly after, with calcium nitrate, ammonium nitrate, calcium ammonium nitrate or limestone ammonium nitrate, ammonium sulphate nitrate, potassium ammonium nitrate (nitropotash), superphosphate, and triple superphosphate. A more detailed list can be found in "Guidance for the compatibility of fertilizer blending materials" by EFMA, Brussels, Belgium, June 2006.

Furthermore, urea particles can be "doped" or coated with elemental sulphur to supply sulphur, or indirectly sulphates, to the soil, preferably in sulphur-deficient soils.

Unfortunately, urea nitrogen cannot be assimilated directly by the plants and needs to be converted through hydrolysis into ammonium and nitrification into nitrate. Urea is first hydrolysed in the soil under the action of an enzyme, commonly called urease, to produce ammonia and carbon dioxide. Ureases are found in numerous bacteria, fungi, algae, plants and some invertebrates, as well as in soils, as a soil enzyme. Urea hydrolysis tends to increase the pH of its environment as the ammonia is dissolved into the water in the soil, and part of the ammonia can also be released into the atmosphere, a process called ammonia volatilization, thus becoming unavailable for the plant. About 50 weight % of nitrogen can sometimes be lost as a result of the volatilization of ammonia, all depending on the soil type, water content, pH, climate conditions, etc.

The availability of nitrogen, originating from urea, to the root system of plants can be improved by combining a urea-containing fertilizer (i.e. by incorporation or addition) with a urease inhibitor. Urease inhibitors are compounds that are capable of temporarily reducing the activity of the enzyme and slow down the rate at which urea is hydrolysed, avoiding peaks of ammonia concentration and therefore limiting the losses to the air. There are many compounds that can inhibit urease, but only a few that are non-toxic, effective at low concentrations, chemically stable enough and able to be combined with urea-containing fertilizers.

Among the most effective urease inhibitors known today are the phosphoric triamide compounds, first disclosed in U.S. Pat. No. 4,530,714 (Allied Corporation, 1985).

An example of an effective urease inhibitor, disclosed in said patent is N-(n-butyl) thiophosphoric triamide, which will be referred to herein as nBTPT. This compound is actually the precursor for the active compound N-(n-butyl) phosphoric triamide (nBPT), obtained through oxidation of the thio-compound, but it is the thio-compound that is commonly produced, sold and used. Throughout this application, when referring to urease inhibitors of the type phosphoric triamide, it is understood that this comprises all active compounds, active precursors and active conversion products, resulting from said phosphoric triamides.

When combined with a urea-containing fertilizer, phosphoric triamide compounds reduce the rate at which urea is hydrolysed to ammonia in the soil. The benefits that are realized as a result of the delayed urea hydrolysis include the following: (1) nutrient nitrogen is available to the plant over a longer period of time, (2) excessive build-up of ammonia in the soil following the application of the urea-containing fertilizer is avoided, (3) the potential for nitrogen loss through ammonia volatilization is reduced, (4) the potential for damage by high levels of ammonia to seedlings and young plants is reduced, (5) plant uptake of nitrogen is increased, and (6) an increase in crop yields is attained. While phosphoric triamide compounds do not directly influence the rate of ammonium nitrification, they do control the levels of ammonium which are subject to the nitrification process and thereby indirectly controls the levels of nitrate nitrogen in the soil.

Surprisingly, the inventors have now been confronted with the problem that the urease inhibitor of the type phosphoric triamide, either applied as a liquid or as a solid, either applied on the particulate urea or mixed in the particulate urea is not stable over a prolonged period of time when in contact with said urea-based composition comprising urea in particulate form, despite the fact that a urease inhibitor of the type phosphoric triamide is generally disclosed for use with said urea-based fertilizers. Moreover, even a urease inhibitor of the type phosphoric triamide in an alkaline organic solvent, such as a mixture of propylene glycol and N-methylpyrrolidine, stabilised to allow for long storage time of the solution, is degraded over a prolonged period of time once applied onto a urea-based composition comprising particulate urea. The problem is most relevant for the storage of said urea-based composition, where the urea in particulate form and the urease inhibitor of the type phosphoric triamide are in intimate contact with one another for a prolonged period of time.

This finding was most surprising, but stimulated the inventors to find a solution for the problem of stabilizing the urease inhibitor (i.e. reducing its degradation) in the presence of urea in particulate form.

In this context, stability refers to the property of a chemical compound, in particular the urease inhibitor compound of resisting chemically degradation. An improved stability means a longer lifetime (or shelf life).

According to one embodiment, the urea-based composition may be in a packaged form, such as a bag. According to another embodiment, the urea-based composition may be a transient composition, as it exists when mixed in a mixing device, for example before it is packaged or applied onto the field.

PRIOR ART

WO2016/137815 (Koch Agronomic Services, LLC, 2016) discloses a solid particulate urea-based composition comprising urea in particulate form and nBTPT as a urease inhibitor. The composition may comprise conditioning agents, that can be basic compounds, such as sodium hydroxide and potassium hydroxide, or buffering agents, such as sodium borate (borax, potassium bicarbonate, sodium carbonate or potassium carbonate) that are added to a molten urea-nitrogen stabilizer composition. Contrary to the present invention, the object was the improvement of the stability of nBTPT-solutions using a carrier system without DCD or using a very pure nBTPT. No embodiment is exemplified according to our invention, nor is disclosed the problem for which the current invention seeks relief, namely the stability of a urease inhibitor of the type phosphoric triamide in the presence of urea.

US2014/0047883 (Koch Agronomic Services, LLC, 2014) discloses a solid particulate urea-based composition comprising urea in particulate from and nBTPT as urease inhibitor added as a solution onto urea. Additional components can be present in the composition; the list of possible other components comprises inorganic alkaline compounds such as calcium carbonate and sodium bicarbonate. The object was the improvement of the stability of nBTPT-solutions using an alkylene glycol alkyl ether as a carrier. No embodiment is exemplified according to our invention, nor is disclosed the problem for which the current invention seeks relief, namely the stability of a urease inhibitor of the type phosphoric triamide in the presence of urea.

US2014/0047884 (Koch Agronomic Services, LLC, 2014) discloses a urea granules composition comprising urea formaldehyde (UF) polymer particles coated with nBTPT. Said coated UF particles can be mixed with the urea granules or can be mixed into the urea melt before granulation. The UF dispersion may contain traces of NaOH, used to adjust the pH of the dispersion during the production process, but no indication is given of the hydroxide-content of the UF-particles after spray-drying the dispersion. The object was the improvement of the stability of nBTPT-solutions using a UF particle coated with nBTPT. No embodiment is exemplified according to our invention, nor is disclosed the problem for which the current invention seeks relief, namely the stability of a urease inhibitor of the type phosphoric triamide in the presence of urea.

CN 102503687 (Stanley Chemical Fertilizer Stock Co., 2012) discloses a melt-granulated fertilizer, where all ingredients are mixed, melted and granulated, comprising urea, MAP, ammonium chloride, potassium chloride, a urease inhibitor, a nitrification inhibitor, a polypeptide synergist and 50 to 140 parts of talcum powder as a filler material. The document does not disclose a physical blend composition according to the current invention and is silent about the problem of the current invention.

WO2011/009572 (SKW Stickstoffwerke Piesteritz GmbH, 2011) teaches in general a urea-based granular fertilizer composition, in particular a particulate blend of urea and ammonium sulphate (Example 7), a urease inhibitor of the type phosphoric triamide in powder form and a paraffin-based wax. The composition does not comprise an alkaline or alkaline-forming inorganic compound, nor is disclosed the problem of the current invention.

US2012/0096912 (Rizzo, 2012) discloses a method for improving the yield of rice plants by applying a granular UAS that includes nBTPT. The composition does not comprise an alkaline or alkaline-forming inorganic compound, nor is disclosed the problem of the current invention.

US 2010/0206031 A1 (Whitehurst, G. B. et al, 2010) describes a composition (Example 7) consisting of nBTPT in a basic organic amine alcohol solvent, coated onto a blend of urea-particles and mono ammonium phosphate particles. The composition does not comprise an alkaline or alkaline-forming inorganic compound, nor is disclosed the problem of the current invention.

US2014/037570 A1 (Whitehurst, G. B. et al, 2014) describes compositions consisting of nBTPT in a basic organic amine solvent, coated onto urea-particles, comprising one or more additional plant nutrients as water soluble salts such as ammonium sulphate, mono ammonium phosphate, potassium sulphate and others. The compositions do not comprise a urea-based composition, nor an alkaline or alkaline-forming inorganic compound, nor is disclosed the problem of the current invention.

In several co-pending applications of the applicant for this invention, the inventors also reported on solid, particulate, urea-based compositions comprising one of urea ammonium sulphate (UAS), urea blends of urea and one or more compounds in particulate form, selected from the group of nitrates, phosphates, sulphates and chlorides, and urea, doped with elemental sulphur, together with a urease inhibitor of the type phosphoric triamide, in particular N-(n-butyl) thiophosphoric triamide (nBTPT), and a stabilizer, with improved stability of the urease inhibitor of the type phosphoric triamide in the presence of urea.

STATEMENT AND SUMMARY OF THE INVENTION

Surprisingly, the inventors now found that the stability of the urease inhibitor of the type phosphoric triamide in the presence of a urea-based composition comprising urea in particulate form, can be greatly improved.

In its broadest concept, the invention is concerned with a solid, particulate, urea-based composition comprising urea in particulate form, and a urease inhibitor of the type phosphoric triamide, wherein the urea-based composition is further characterized in that it comprises one or more alkaline or alkaline-forming inorganic compounds.

With regard to the activity of the alkaline or alkaline-forming inorganic compounds, without being bound by theory, it is hypothesised that the alkaline or alkaline-forming inorganic compound neutralises the released phosphoric acid which is formed during decomposition of the urease inhibitor of the type phosphoric triamide in view of the fact that the decomposition of the urease inhibitor of the type phosphoric triamide is acid-catalysed. As such, the autolytic decomposition of the urease inhibitor of the type phosphoric triamide is at least slowed down.

By the integration of the stabilizer into the urea-based composition comprising urea, and a urease inhibitor of the type phosphoric triamide, the stability of the urease inhibitor of the type phosphoric triamide is greatly improved, especially during storage, such that lower amounts of said urease inhibitor may be used.

Accordingly, the present invention provides a solid, particulate, urea-based composition comprising urea in particulate form, and a urease inhibitor of the type phosphoric triamide, wherein the urea-based composition is further characterized in that it comprises 0.0001 to 5 weight %, relative to the total weight of the composition, of, of one or more alkaline or alkaline-forming inorganic compounds.

In a preferred embodiment of the present invention, the urea-based composition is further characterized in that the average particle size (dp50) of the urea in particulate form is between 1.0 mm and 5 cm, as determined by mesh sieve screening.

In a preferred embodiment of the present invention, the urea-based composition is characterized in that it further comprises an anti-caking and/or moisture repellent and/or anti-dust coating.

In a preferred embodiment of the present invention the urea-based composition is characterized in that the urease inhibitor of the type phosphoric triamide is a compound of formula:

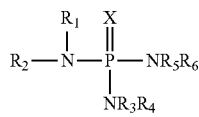

Wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl; or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and $R_3$, $R_4$, $R_5$ and $R_6$ are individually hydrogen or alkyl having 1 to 6 carbon atoms.

In a preferred embodiment of the present invention the urease inhibitor in said urea-based composition is N-(n-butyl) thiophosphoric triamide (nBTPT).

In a preferred embodiment of the present invention, the urease inhibitor, in particular N-(n-butyl) thiophosphoric triamide (nBTPT) is present in the urea-based composition at a level of 0.0001 to 1% weight %, preferable 0.02 to 0.2% weight %, most preferably 0.04 to 0.06 weight %, relative to the total weight of the urea-based composition.

In a preferred embodiment of the present invention, the urease inhibitor of said urea-based composition in liquid or in particulate form is applied onto the urea, is melt-mixed with the urea, or a combination thereof.

In a preferred embodiment of the present invention, the alkaline-forming or alkaline inorganic compound in said urea-based composition is selected from the group of metal oxides, carbonates, hydroxides and acetates, and any mixture thereof.

In a preferred embodiment of the present invention, the alkaline-forming or alkaline compound in said urea-based composition is selected from the group of calcium oxide, sodium hydroxide, sodium hydrogen carbonate, sodium carbonate, borax, zinc oxide, magnesium oxide, calcium carbonate, and any mixture thereof.

In a preferred embodiment of the present invention, the alkaline-forming or alkaline compound is present in the urea-based composition at a level of 0.02 to 1 weight %, most preferably 0.05 to 1 weight %, relative to the total weight of the composition.

In a preferred embodiment of the present invention, the weight ratio of urease inhibitor of the type phosphoric triamide to one or more alkaline or alkaline-forming inorganic compounds within the urea-based composition ranges from 1:20 to 1:1, preferably from 1:15 to 1:1, more preferably from 1:10 to 1:1.

In a preferred embodiment of the present invention, the urea-based composition further comprises an anti-caking and/or moisture repellent and/or anti-dust coating, applied onto the particulate compounds of the urea-based composition, wherein the coating comprises at least a non-polar material, in particular a liquid organic material, such as an oil, wax, resin or the like and any mixture thereof and is present in the composition at a level of 0.0001 to 1 weight %, preferable 0.02 to 0.5 weight %, most preferably 0.1 to 0.2 weight %, relative to the total weight of the composition.

In a preferred embodiment of the present invention, the urea-based composition also comprises the regular processing additives.

In a preferred embodiment of the present invention, the urea-based composition is packaged without the presence of a head space.

In a preferred embodiment of the present invention, the urea-based composition further comprises one or more urea-based compounds, selected from the group of urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), urea-based NPK's, or mixtures thereof.

In a preferred embodiment of the present invention, the urea-based composition further comprises one or more further compounds, selected from the group of ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis(dihydrogen orthophosphate), super phosphate, triple superphosphate, rock phosphate, potassium sulphate, potassium magnesium sulphate, ammonium sulphate (AS), urea ammonium sulphate, urea calcium ammonium nitrate, urea ammonium sulphate, potassium chloride (MOP), urea potassium salts (UK), or mixtures thereof.

In a preferred embodiment of the present invention, the urea-based composition comprises from about 0 to 60 weight % of one or more compound in particulate form, selected from the groups as defined above, i.e. the group of urea-based compounds and the group of further compounds.

In a preferred embodiment of the present invention the urea-based composition contains:

40 to 99 weight % of urea in particulate form;

0 to 60 weight % of one or more compounds in particulate form, selected from the groups of urea-based compounds and further compounds;

0.0001 to 1 weight % of a urease inhibitor of the type phosphoric triamide;

0.0001 to 5 weight % of one or more alkaline or alkaline-forming inorganic compounds;

0 to 1 weight % of an anti-caking and/or moisture repellent and/or anti-dust coating;

adding up to 100 weight %, being the total weight of the composition.

In a preferred embodiment of the present invention, the urea-based composition comprises urea in particulate form melt-mixed with a urease inhibitor of the type phosphoric triamide, in particular N-(n-butyl) thiophosphoric triamide (nBTPT), and calcium oxide.

In a preferred embodiment of the present invention, the urea-based composition comprises urea in particulate form, melt-mixed with a urease inhibitor of the type phosphoric triamide, in particular N-(n-butyl) thiophosphoric triamide (nBTPT), and calcium carbonate.

In a preferred embodiment of the present invention the urea-based composition comprises urea in particulate form, melt-mixed with a urease inhibitor of the type phosphoric triamide, in particular N-(n-butyl) thiophosphoric triamide (nBTPT), and sodium hydroxide.

In a preferred embodiment of the present invention the urea-based composition comprises urea in particulate form, melt-mixed with a urease inhibitor of the type phosphoric triamide, in particular N-(n-butyl) thiophosphoric triamide (nBTPT), and borax.

In a preferred embodiment of the present invention the urea-based composition comprises urea in particulate form, melt-mixed with a urease inhibitor of the type phosphoric triamide, in particular N-(n-butyl) thiophosphoric triamide (nBTPT), and a mixture of calcium carbonate, calcium oxide and/or sodium hydroxide.

In a preferred embodiment of the present invention the urea-based composition comprises urea in particulate form coated with a urease inhibitor of the type phosphoric triamide, in particular N-(n-butyl) thiophosphoric triamide (nBTPT), and magnesium oxide.

The present invention further provides for the use of the solid, particulate urea-based composition according to different embodiments of the present invention as a fertilizer, in particular for supporting the growth of agricultural products on a sulphur—deficient soil, a phosphor—deficient soil and/or a potassium—deficient soil.

The present invention further provides for the use of the solid, particulate urea-based composition according to different embodiments of the present invention as an animal feed.

The present invention further provides for a method for the manufacture of a solid, particulate, urea-based composition according to the present invention, the method comprising the steps of:

1) providing a urea material;

2) mixing the urea material with a urease inhibitor in solid particulate or liquid form, preferably wherein the urease inhibitor is N-(n-butyl) thiophosphoric triamide (nBTPT) and 0.0001 to 5 weight %, relative to the total weight of the composition, of an amount of one or more alkaline or alkaline-forming inorganic compounds;

3) optionally providing a particulate material, comprising one or more compounds selected from the group of urea-based compounds and/or further compounds as defined above;

4) mixing the materials obtained in steps 2) and 3);

5) optionally, applying a coating to one or more of the particulate compounds, wherein the coating that is able to increase at least the anticaking and/or water repellence and/or anti-dust properties of said urea-based composition.

According to one embodiment, the urea material provided in step 1 is a urea melt, and the urease inhibitor in solid particulate or liquid form, preferably wherein the urease inhibitor is N-(n-butyl) thiophosphoric triamide (nBTPT) and one or more alkaline or alkaline-forming inorganic compounds is melt mixed.

According to another embodiment, the urea material provided in step 1 is a solid particulate urea material, and the urease inhibitor in solid particulate or liquid form, preferably wherein the urease inhibitor is N-(n-butyl) thiophosphoric triamide (nBTPT) and one or more alkaline or alkaline-forming inorganic compounds is applied as a coating.

The present invention further provides for a kit of parts, comprising:

a) one or more alkaline or alkaline-forming inorganic compounds;

b) the urease inhibitor of the type phosphoric triamide in solid particulate or liquid form, preferably wherein the urease inhibitor is N-(n-butyl) thiophosphoric triamide (nBTPT);

c) optionally, one or more anti-caking and/or moisture repellent and/or anti-dust compounds.

The present invention further provides for a method for improving the stability of a urease inhibitor of the type phosphoric triamide, in particular N-(n-butyl) thiophosphoric triamide, (nBTPT) in a solid, particulate, urea-based composition comprising urea in particulate form and said urease inhibitor, comprising the steps of:

a) addition to the composition of 0.0001 to 5 weight %, relative to the total weight of the composition, of one or more alkaline or alkaline-forming inorganic compounds; and optionally b) application of an anticaking and/or moisture repellent coating onto said urea-based composition.

The invention will now be described in more detail.

DETAILED DESCRIPTION OF THE INVENTION

Within the context of this application, with a particulate form is meant a physical form that can also be designated as granulated, prilled, crystalline, compacted, powdered, and the like, wherein the respective compound is in a small unit form.

Herein after, the one or more alkaline or alkaline-forming inorganic compounds is called a stabilizer.

Urease Inhibitor

In its broadest concept, the invention is concerned with a solid, particulate, urea-based composition comprising urea in particulate form and a urease inhibitor of the type phosphoric triamide, in particular N-(n-butyl) thiophosphoric triamide (nBTPT), wherein the urease inhibitor of the type phosphoric triamide is a compound of formula I:

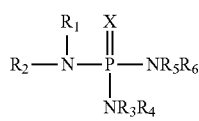

Formula I
wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl, or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
$R_3$, $R_4$, $R_5$ and $R_6$ are individually hydrogen or alkyl having 1 to 6 carbon atoms. In the present specification and claims, the term "phosphoric triamide compounds" is used to refer to the compounds of formula I.

The terms alkyl, cycloalkenyl, aralkyl, aryl, alkenyl, alkynyl, and cy-cloalkyl as used herein, refer to compounds having from up to 10 carbon atoms, preferably up to 6 carbon atoms. The lowest number of carbon atoms is between 1-3 depending on the structure of the substituent. nBTPT is sold in the market, in different formulations and has the following chemical formula

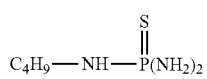

It should be understood that the term nBTPT, as used throughout this specification, refers not only to N-(n-butyl) thiophosphoric triamide in its pure form, but also to industrial grades of this compound which may contain up to 50 weight % impurities, depending on the method of synthesis and purification scheme(s), if any, employed in the production of the nBTPT.

In order to be effective, the urease inhibitor of the type phosphoric triamide, in particular N-(n-butyl) thiophosphoric triamide (nBTPT) is present in the urea-based composition at a level of 0.0001-1% weight %, preferable 0.02-0.2% weight %, most preferably 0.04-0.06 weight %, relative to the total weight of the urea-based composition.

In embodiments where the urease inhibitor is used in its liquid form, it is preferably used as a 0.1 to 75 weight % solution, preferably as a 15 to 30 weight % solution. Commercial solutions are available, for example as Agrotain® Ultra (Koch, US), N Yield™ (Eco Agro, US), Rhodia Ag-Rho™ N Protect B (Solvay, Germany), Iper N-Protect Liquid (Van Iperen, The Netherlands) and BASF Limus (BASF, Germany).

Experiments showed that, in compositions according to the invention, less urease inhibitor of the type phosphoric triamide, in particular N-(n-butyl) thiophosphoric triamide (nBTPT) needs to be used than is commonly employed in the prior art. For example, an amount of 0.05 weight % is mostly preferred as already agronomically efficient, while for the use of Agrotain® Ultra, an amount of 0.09 weight % is recommended. This finding can at least partly be attributed to the fact that in the compositions according to the invention, the urease inhibitor of the type phosphoric triamide, in particular N-(n-butyl) thiophosphoric triamide (nBTPT) is stabilized, while in the prior art, an overdose is needed to compensate for the degradation of the urease inhibitor and to increase shelf-live thereof. This finding also ensures that less urease inhibitor of the type phosphoric triamide, in particular N-(n-butyl) thiophosphoric triamide (nBTPT) is introduced into the environment. In embodiments where the urease inhibitor is used in its solid form, it is used as a powder, preferably with a purity of 99 weight % or more. It is available, for example, from Sunfit Chemical Co. (China).

According to one embodiment, the urease inhibitor of the type phosphoric triamide, in particular N-(n-butyl) thiophosphoric triamide (nBTPT) is applied to the urea in particulate form as a coating using common coating and blending techniques, well known to the skilled person, such as spray-coating and drum-coating. The urease inhibitor of the type phosphoric triamide, in particular N-(n-butyl) thiophosphoric triamide (nBTPT) may be applied onto the urea in liquid or in particulate form.

When in particulate form, the particle size (dp50) of the urease inhibitor of the type phosphoric triamide, in particular N-(n-butyl) thiophosphoric triamide (nBTPT), is preferably between 1 and 1000 µm, preferable between 10 and 500 µm, as determined by mesh sieve screening.

According to another embodiment, the urease inhibitor of the type phosphoric triamide, in particular N-(n-butyl) thiophosphoric triamide (nBTPT) is melt-mixed with the urea, in the sense that the urease inhibitor of the type phosphoric triamide, in particular N-(n-butyl) thiophosphoric triamide (nBTPT) is mixed in a urea melt, either as solid or as liquid, after which the melt is processed into solid particles.

According to yet another embodiment, a combination of application onto the urea in liquid or in particulate form and melt-mixing can be used.

Within the context of this invention, melt-mixed refers to a state where the urease inhibitor of the type phosphoric triamide, in particular N-(n-butyl) thiophosphoric triamide (nBTPT) is mainly present inside the solid particle, typically adding during the forming process of the solid particle.

It is preferred that the urease inhibitor of the type phosphoric triamide, in particular N-(n-butyl) thiophosphoric triamide (nBTPT), is in intimate contact with the urea for the urease inhibitor to be most effective in terms of urease inhibition. However, embodiments may be foreseen wherein the urease inhibitor is applied as a coating to one or more other particulate compounds of the composition of the invention, such as the stabilizer.

Stabilizer

According to the present invention, the solid, particulate, urea-based composition comprising urea in particulate form and a urease inhibitor of the type phosphoric triamide, comprises one or more alkaline or alkaline-forming inorganic compounds.

Compositions comprising organic alkaline solvents acting as carriers for a urease inhibitor of the type phosphoric triamide are known from e.g. US patent applications 2010/0206031 and 2014/0037570, and are also commercially available. It is known that said organic alkaline solvents stabilize the solution of the urease inhibitor of the type phosphoric triamide.

Remarkably, it has been shown (see experimental part example 3) that the addition of the stabilizers according to the invention, when added to compositions comprising organic alkaline solvents acting as carriers for a urease inhibitor of the type phosphoric triamide, severally deteriorates that stability of said urease inhibitor of the type phosphoric triamide. All the more, it is surprising that the addition of the stabilizers according to the invention to urea comprising a urease inhibitor of the type phosphoric triamide stabilizes said urease inhibitor of the type phosphoric triamide, present in and/or on the urea particles.

According to one embodiment, said stabilizer is selected from the group of: metal oxides, such as calcium oxide, borax, magnesium oxide, zinc oxide, sodium oxide, aluminium oxide, barium oxide and copper oxide; carbonates, such as calcium carbonate, sodium carbonate, sodium hydrogen carbonate, ammonium carbonate, barium carbonate; hydroxides, such as aluminium hydroxide, ammonium hydroxide, sodium hydroxide, potassium hydroxide, calcium hydroxide, magnesium hydroxide, iron hydroxide, barium hydroxide and tetraalkyl/aryl ammonium hydroxides; and acetates, such as sodium acetate, ammonium acetate, magnesium acetate, zinc acetate and barium acetate; and any mixture thereof.

The stabilizer may be a solid, preferably a particulate material, a liquid, or a suspension (solid in liquid).

According to one embodiment, the stabilizer is melt-mixed in the urea melt, either before, simultaneously, or after the addition of the urease inhibitor, after which particles are formed from the melt.

According to one embodiment, the stabilizer is applied as a coating to the particles of the urea-based composition, in particular to said urea in particulate form and/or to said one or more additional compounds, either before, simultaneously, or after the addition of the urease inhibitor to said particles.

According to another embodiment, the stabilizer may be melt-mixed and the urease inhibitor may be externally applied to the particulate melt mixed material, or vice versa: the urease inhibitor may be melt-mixed and the stabilizer may be externally applied to the particulate melt mixed material.

When in particulate form, the particle size (dp50) of the stabilizer is between 1 and 1000 µm, preferable between 10 and 500 µm, as determined by mesh sieve screening. For example, for CaO, a dp50 of about 22 µm was found very effective.

By including the stabilizer into the urea-based composition comprising urea in particulate form, and a urease inhibitor of the type phosphoric triamide, the stability of the urease inhibitor of the type phosphoric triamide is greatly improved, leading, among others, to the possibility of a more prolonged storage while keeping the urease inhibition property, before subsequent use of said urea-based composition.

Preferably, the stabilizer is selected from the group of calcium oxide, zinc oxide, sodium hydroxide, borax, magnesium oxide, calcium carbonate, and any mixture thereof. Advantageously, these metals (Na, Ca, Zn and Mg) may also function as a nutrient element to plants in the soil.

In order to be effective, the stabilizer is present in the composition at a level of 0.0001 to 5 weight %, preferable 0.02 to 1 weight %, most preferably 0.05 to 1 weight %, relative to the total weight of the composition.

According to one embodiment, the weight ratio of urease inhibitor of the type phosphoric triamide (either liquid or solid) to the one or more alkaline or alkaline-forming inorganic compounds ranges from 1:20 to 1:1, preferably from 1:15 to 1:1, more preferably from 1:10 to 1:1. Exemplary, a weight ratio of nBTPT to CaO of about 1:5.5 was used.

The stabilizer is applied to the composition comprising the urea as a coating by common application techniques, such as coating and blending techniques, well known to the skilled person, such as spray-coating and drum-coating. It is preferred that the stabilizer and the urease inhibitor of the type phosphoric triamide is in intimate contact with each other, in order for the stabilizer to be effective. This can be achieved, most preferably, through the application of the urease inhibitor of the type phosphoric triamide, the stabilizer and an optional anti-caking and/or moisture repellent and/or anti-dust coating, to the particles, either successively, or simultaneously, for example as a liquid anti-caking and/or moisture repellent and/or anti-dust coating composition comprising the urease inhibitor of the type phosphoric triamide and the stabilizer.

Urea

The solid, particulate, urea-based composition may comprise from about 40 to 99 weight % of urea in particulate form.

Preferably, to serve as a fertilizer, the average particle size (dp50) of the urea in particulate form is between 1.0 mm and 5 cm, preferably between 1.0 mm and 1 cm, preferably between 1.0 and 6.0 mm, preferably between 2.0 and 4.0 mm, preferably between 3.0 and 5.0 mm, preferably between 2.5 and 3.6 mm, as determined by mesh sieve screening.

The urea may be particulated by any commonly used technology, like for instance: granulation, prilling, pelleting, rotoforming, etc. It may contain elemental sulphur, be coated with micronutrients or other nutrients, or be treated in any other way.

It may contain any other processing additive, such as granulation additive, typically a urea-formaldehyde condensate, etc.

Urea-Based Compounds and Further Compounds

The solid, particulate, urea-based composition according to the invention may also comprise a urea-based compound and/or a further compound in particulate form.

The urea-based compound may be selected from the group of urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK) such as salts derived from mixtures of urea with MPO and/or SOP, urea-based NPK's, or mixtures thereof.

The urea-based compound may be a granulated or prilled material that is commonly and widespread available. It may contain elemental sulphur, be coated with micronutrients or other nutrients, or be treated in any other way.

The definition of the urea-based compound, as disclosed herein, does not comprise its use as a coating material. Such coating material has a smaller particle size (dp50), usually between 0.1 and 100 µm.

The urea-based composition may comprise from about 0 to about 60 weight %, relative to the total weight of the composition, of one or more urea-based compounds in particulate form.

Preferably, to serve as a fertilizer, the average particle size (dp50) of the one or more urea-based compounds in particulate form is between 1.0 mm and 5 cm, preferably between 1.0 mm and 1 cm, preferably between 1.0 and 6.0 mm, preferably between 2.0 and 4.0 mm, preferably between 3.0 and 5.0 mm most preferably between 2.5 and 3.6 mm, as determined by mesh sieve screening.

The one or more further compounds in particulate form may be at least one of the following compounds: ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis(dihydrogen orthophosphate), super phosphate, triple superphosphate, rock phosphate, potassium sulphate, potassium magnesium sulphate, ammonium sulphate (AS), urea ammonium sulphate, urea calcium ammonium nitrate, urea ammonium sulphate, potassium chloride (MOP), urea potassium salts (UK), or mixtures thereof.

Said further compound may be a granulated or prilled material that is commonly and widespread available. It may contain elemental sulphur, be coated with micronutrients or other nutrients, or be treated in any other way.

The urea-based composition may comprise from about 0 to about 60 weight %, relative to the total weight of the composition, of one or more further compounds in particulate form.

Preferably, to serve as a fertilizer, the average particle size (dp50) of the one or more further compounds in particulate form is between 1.0 mm and 5 cm, preferably between 1.0 mm and 1 cm, preferably between 1.0 and 6.0 mm, preferably between 2.0 and 4.0 mm, preferably between 3.0 and 5.0 mm most preferably between 2.5 and 3.6 mm, as determined by mesh sieve screening.

Anti-Caking and/or Moisture Repellent and/or Anti-Dust Coating

Optionally, an anti-caking and/or moisture repellent and/or anti-dust coating may be applied onto the particulate compounds of the urea-based composition, wherein the coating material is able to increase the moisture repellence of the urea in particulate form and/or the other compounds in particulate form. Furthermore, the coating may also be able to reduce dust formation. Preferably, the coating material is a non-polar material, in particular a liquid organic material, such as an oil, wax, resin or the like and any mixture thereof. The coating material is present in the composition at a level 0 to 1 weight %, preferably 0.0001 to 1 weight %, more preferable 0.02 to 0.5 weight %, most preferably 0.1 to 0.2 weight %, relative to the total weight of the composition.

Examples of suitable anticaking and/or moisture-repellent coatings are vegetable oil (e.g. rapeseed or neem), paraffin and Novoflow anti-caking and/or moisture repellence agents (Novochem Fertilizer Additives, The Netherlands).

Preferably, the moisture-repellent coating is a coating such as disclosed in EP 0768993 A1 (Norsk Hydro ASA), the content of which is enclosed hereby by reference, for a nitrogen-containing fertilizer, comprising at least a wax, an oil and a resin which is oil-soluble and miscible with wax (Tropicote®).

According to another option, the coating can be an urea formaldehyde coating.

Further Effects

It was also observed that, under bagged conditions without the presence of a head space, i.e. with the substantial exclusion of moisture, atmospheric gasses such as oxygen, nitrogen, etc., the stability of the urease inhibitor of the type phosphoric triamide, in particular N-(n-butyl) thiophosphoric triamide (nBTPT) in the composition according to the invention, was further increased. Hence, the invention is in particular directed to a packaged, preferably bagged, urea-based composition comprising urea in particulate form. As used in this application, "bagged" means that the product is packaged such that it is in essence not in contact with moisture and atmospheric gasses during the period it is packaged. Hence, the package may be a bag, big bag, container, box, etc., being in principle all packaging without the substantial presence of a head space, filled with an atmosphere, such as air. As used in this application, "bagged" further means that the product is packaged in manageable unit amounts, such as 5 kg, 10 kg, 15 kg, 20 kg, 25 kg, 50 kg, or more, and usually packaged using a plastic material, preferably a foil, from such materials as paper, cardboard, polyethylene, polyvinyl and polycarbonate.

Accordingly, a particular aspect refers to a container or package comprising the urea-based composition as disclosed herein, wherein the head space in said container or package is less than about 1%.

In the context of the present invention, the term "headspace" refers to the volume left at the top of the almost filled container before or after sealing.

In the context of the present invention, the term "about", when associated with the headspace, means +/− 0,1%. For example, "about 1%" means that 1.1%, 1.05%, 0.95% or 0.9% are also encompassed.

In a preferred embodiment, the container as described herein comprises a headspace of less than 1%, preferably less than 0.75%, preferably less than 0.5%, preferably less than 0.25% and preferably no headspace, based on the total volume of said container.

Composition

Preferably, the solid, particulate urea-based composition according to the invention is a homogeneous composition, wherein all particles of the composition are randomly in intimate contact with each other.

According to one aspect of the invention, the solid, particulate, urea-based composition according to the present invention comprises:

40 to 99 weight % of urea in particulate form;

0 to 60 weight % of one or more further components in particulate form, selected from the groups as defined above;

0.0001 to 1 weight % of a urease inhibitor of the type phosphoric triamide;

0.0001 to 5 weight % of one or more alkaline or alkaline-forming inorganic compounds;

0 to 1 weight % of an anti-caking and/or moisture repellent and/or anti-dust coating adding up to 100 weight %, being the total weight of the composition.

In a preferred embodiment of the present invention the urea-based composition comprises urea in particulate form melt-mixed with a urease inhibitor of the type phosphoric triamide, in particular N-(n-butyl) thiophosphoric triamide (nBTPT), and calcium oxide.

In a preferred embodiment of the present invention the urea-based composition comprises urea in particulate form melt-mixed with a urease inhibitor of the type phosphoric triamide, in particular N-(n-butyl) thiophosphoric triamide (nBTPT), and calcium carbonate.

In a preferred embodiment of the present invention the urea-based composition comprises urea in particulate form melt-mixed with a urease inhibitor of the type phosphoric triamide, in particular N-(n-butyl) thiophosphoric triamide (nBTPT), and sodium hydroxide.

In a preferred embodiment of the present invention the urea-based composition comprises urea in particulate form melt-mixed with a urease inhibitor of the type phosphoric triamide, in particular N-(n-butyl) thiophosphoric triamide (nBTPT), and borax.

In a preferred embodiment of the present invention the urea-based composition comprises urea in particulate form, melt-mixed with a urease inhibitor of the type phosphoric triamide, in particular N-(n-butyl) thiophosphoric triamide (nBTPT), and a mixture of calcium carbonate, calcium oxide and/or sodium hydroxide.

In a preferred embodiment of the present invention the urea-based composition comprises urea in particulate form coated with a urease inhibitor of the type phosphoric triamide, in particular N-(n-butyl) thiophosphoric triamide (nBTPT), and magnesium oxide.

Use of the Composition

The solid, particulate urea-based composition according to the invention is in particular suitable as a fertilizer, in particular for supporting the growth of agricultural products on a sulphur—deficient soil, for supporting the growth of agricultural products on a phosphor—deficient soil, for supporting the growth of agricultural products on a potassium—deficient soil and as an animal feed.

Method

The invention further relates to a method for the manufacture of a solid, particulate urea-based composition comprising urea in particulate form and a urease inhibitor of the type phosphoric triamide, in particular N-(n-butyl) thiophosphoric triamide (nBTPT).

In particular, the invention relates to a method for the manufacture of a solid, particulate, urea-based composition according to the invention, the method comprising the steps of:
1) providing a urea material;
2) mixing the urea material with a urease inhibitor in solid particulate or liquid form, preferably wherein the urease inhibitor is N-(n-butyl) thiophosphoric triamide (nBTPT) and one or more alkaline or alkaline-forming inorganic compounds;
3) optionally providing a particulate material, comprising one or more urea-based compounds and/or further compounds selected from the group as defined above;
4) mixing the materials obtained in steps 2) and 3);
5) optionally, applying a coating to one or more of the particulate compounds that is able to increase at least the anti-caking and/or water repellence and/or anti-dust properties of said urea-based composition, Kit-of-Parts The invention further relates to a kit of parts, comprising:
a) one or more alkaline or alkaline-forming inorganic compounds;
b) the urease inhibitor of the type phosphoric triamide in solid particulate or liquid form, preferably wherein the urease inhibitor is N-(n-butyl) thiophosphoric triamide (nBTPT);
c) optionally, one or more anti-caking and/or moisture repellent and/or anti-dust compounds.

Such kit of parts can then be added to the urea-based composition, in particular to the particulate urea or to the one or more urea-based compounds or further components in particulate form to obtain the solid, particulate, urea-based composition comprising urea in particulate form, and optionally one or more urea-based compounds and/or further components in particulate form, the stabilizer and a urease inhibitor of the type phosphoric triamide according to the invention.

The preferred embodiments of the method according to the invention will now be illustrated by means of the following non-limitative examples.

EXAMPLES

The following examples are included to demonstrate certain embodiments of the invention. It should be appreciated by the skilled person that the techniques disclosed in the examples represent techniques discovered by the inventors to function well in the practice of the invention. The skilled person should, however, in light of the present invention, appreciate that many changes can be made in the specific embodiments that are disclosed and still obtain a like or similar result without departing from the spirit and scope of the invention, therefore all matter set forth is to be interpreted as illustrative and not in a limiting sense.

nBTPT Experiments nBTPT in Urea

Figure 1:
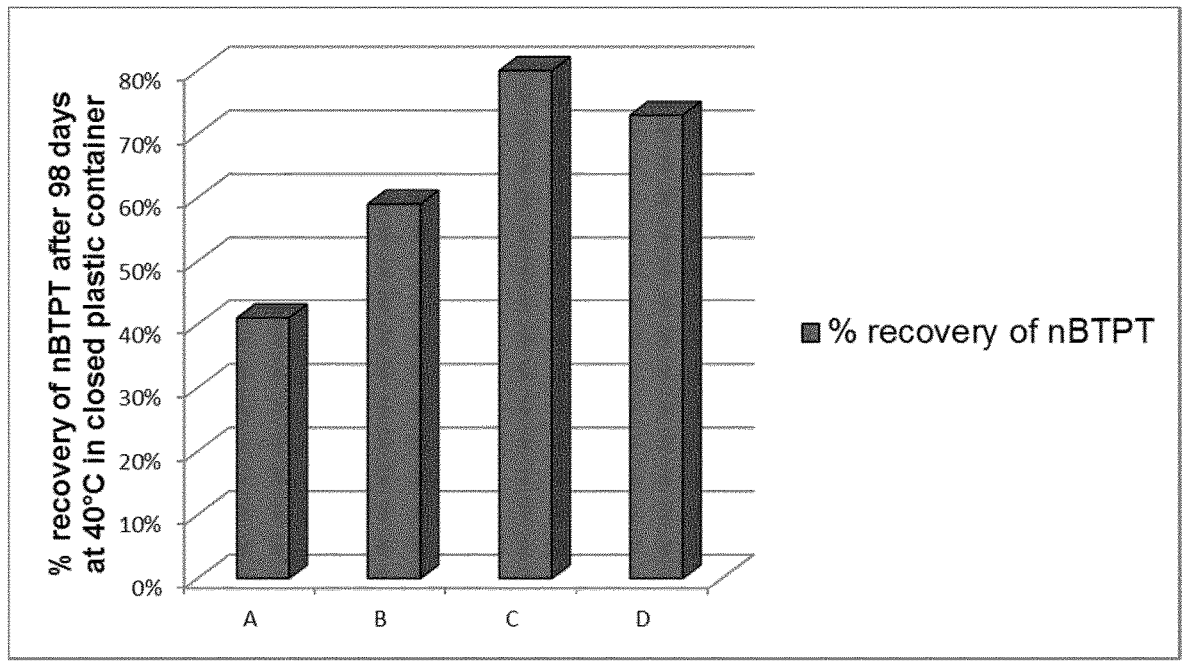
FIG. 1: Stability of nBTPT in urea with storage in closed plastic containers at 40° C. for 98 days. {A=500 ppm nBTPT powder in urea, B=500 ppm nBTPT powder in [urea+200 ppm NaOH], C=500 ppm nBTPT powder in [urea+500 ppm NaOH], D=500 ppm nBTPT powder in [urea+1000 ppm NaOH]}.

For pilot scale experiments applying nBTPT in urea, nBTPT, as powder or as liquid formulations, was mixed in urea in the following way: nBTPT was added to urea melt, with and/or without the presence of an alkaline stabilizer and subsequently, this mixture was granulated in a fluidized bed granulator.

nBTPT in urea granules, with and/or without the presence of an alkaline stabilizer, were produced in the urea pilot plant in Sluiskil (Yara International ASA). This pilot plant has a batch capacity—after sieving—of about 50 kg of on-spec product. It basically consists of a stirred urea preparation vessel with an active volume of about 150 litres and a fluidized bed granulator of the UFT-type, equipped with a spraying nozzle of the spiral-type or HFT-type (EP 1701798 B1, 2005, Yara International ASA).

nBTPT on Urea

For lab scale experiments for applying nBTPT on urea, nBTPT, as powder or as liquid formulations, was applied onto urea by adding 1.2 kg of urea to a lab scale drum. In a next step, the nBTPT material, with and/or without the presence of an alkaline stabilizer, was slowly added. A residence time of 10 minutes was applied and the rotating speed of the drum was consequently the same in each experiment. Larger scale experiments with amounts up to 40 kg of fertilizer material were performed in a concrete mixer.

nBTPT in Solutions

Lab scale experiments with nBTPT in solution:
An aqueous solution of nBTPT was made by dissolving 3 g nBTPT powder in 1 L water. In a next step an alkaline compound could be added.

A solution of 17.5% nBTPT in PG was made by dissolving step by step 17.5 g nBTPT powder in 82.5 g PG. In a next step, an alkaline compound could be added.

The commercial liquid nBTPT formulation Agrotain® Ultra was mixed with and/or without the presence of an alkaline stabilizer The samples were stored under several conditions, dependent on the type of samples:
Closed plastic container at room temperature (20° C.)
Open to air at 20° C. with a relative humidity of 80%
For some samples, an accelerated stability test was done storing these samples at elevated temperatures:
40° C. closed plastic container
50° C. closed plastic container
70° C. closed plastic container Determination of Stability of nBTPT HPLC Analysis of nBTPT-Content HPLC analysis of nBTPT is done as described in the procedure CEN 15688-2007.

Products

Solid N-(n-butyl)thiophosphoric triamide was obtained from Sunfit Chemical Co. (China) (CAS-Nr. 94317-64-3), as a white crystalline solid with a melting point of 58-60° C.

Urea was obtained from Yara as granules YaraVera® Urea 46-0-0 (product code PA38M2).

Calcium oxide CAS 1305-78-8: 2 sources were applied:
1) Nordkalk Quicklime 0-0, 1LA, 91.8% CaO, 0.8% SiO2, 1.5% MgO, 0.8% Al2O3), 86%<40 micron
2) CaO, technical grade, VWR chemicals, >=92% CaO Magnesium oxide CAS 1309-48-4: technical grade, >=90% MgO, 2-2.9% CaO, 1.1% SiO2, dp50 27 micron Calcium carbonate CAS 471-34-1: 2 sources were applied:
1) limestone powder Nordkalk C7, 98.5% carbonate, CaCO3>75%, dp50 7 micron
2) Suprapur® Merck, >=99.95% CaCO3

Sodium hydroxide CAS 1310-73-2, NaOH powder (crushed tablets), VWR chemicals

Sodium carbonate CAS 497-19-8, Certipur®, Merck

Sodium hydrogen carbonate CAS 144-55-8, Emsure® ACS, Reag. Ph. Eur. Analytical reagent, Merck Borax or disodium tetraborate decahydrate ($Na_2B_4O_7 \cdot 10H_2O$) CAS1303-96-4, ACS, ISO, Reag. Ph. Eur., Merck Example 1—nBTPT in Urea This example shows the positive effect of several alkaline stabilizers added into urea melt on the stability of nBTPT in urea.

In the first experiment, 500 ppm nBTPT powder was added into urea melt, with and/or without the presence of an alkaline stabilizer, and in a next step this melt composition was converted into urea granules in a fluidized bed granulator. Subsequently, the granules were stored for 98 days at 40° C. in closed plastic containers and the decomposition of nBTPT was followed. The results are shown in FIG. 1. The addition of NaOH seems to have a positive effect on the stability of nBTPT in urea granules during storage and the stability of nBTPT increases with increased dosage of NaOH.

Figure 2:
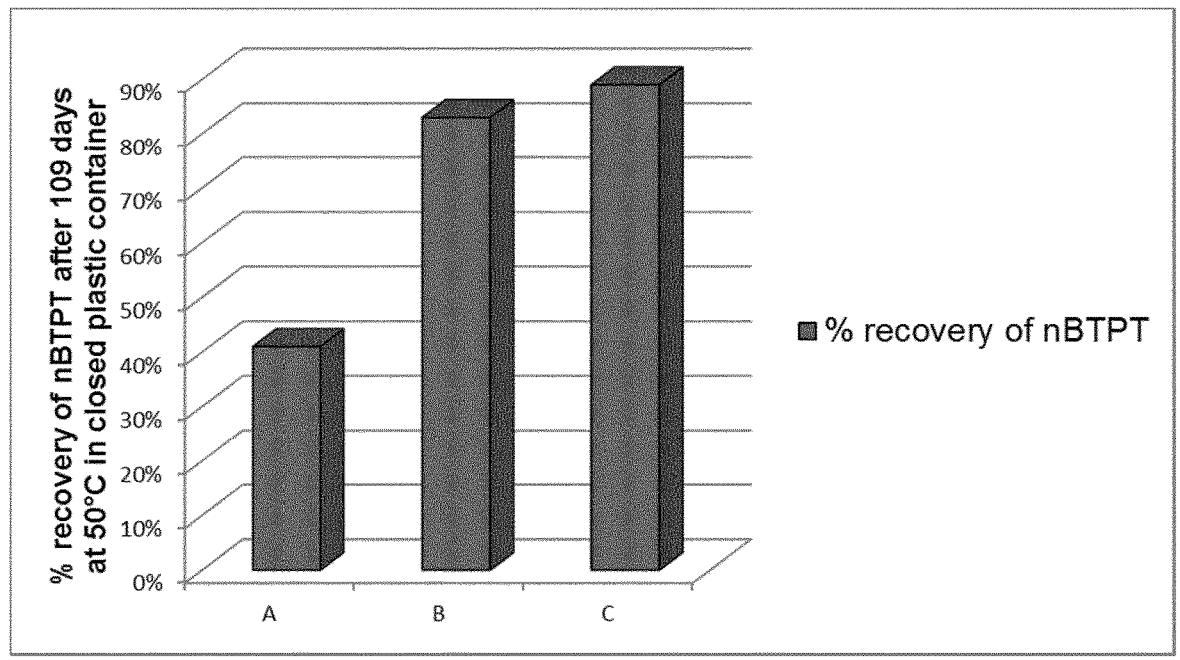
FIG. 2: Stability of nBTPT in urea with storage in closed plastic containers at 50° C. for 109 days. {A=500 ppm nBTPT powder in [urea+500 ppm NaOH], B=500 ppm nBTPT powder in [urea+1% CaO], C=500 ppm nBTPT powder in [urea+1% $CaCO_3$]}.

In a second experiment, the effect of other alkaline stabilizers such as CaO and $CaCO_3$ was shown in comparison with NaOH. 500 ppm nBTPT powder was added into urea melt, containing an alkaline stabilizer, and in a next step, this melt composition was converted into urea granules in a fluidized bed granulator. Subsequently, the granules were stored for 109 days at 50° C. in closed plastic containers and the decomposition of nBTPT was followed. The results are shown in FIG. 2. FIG. 1 showed the positive effect of NaOH on the stability of nBTPT in urea. Now, FIG. 2 shows that the addition of 1% CaO and 1% $CaCO_3$ results in an even higher stability of nBTPT in urea.

Figure 3:
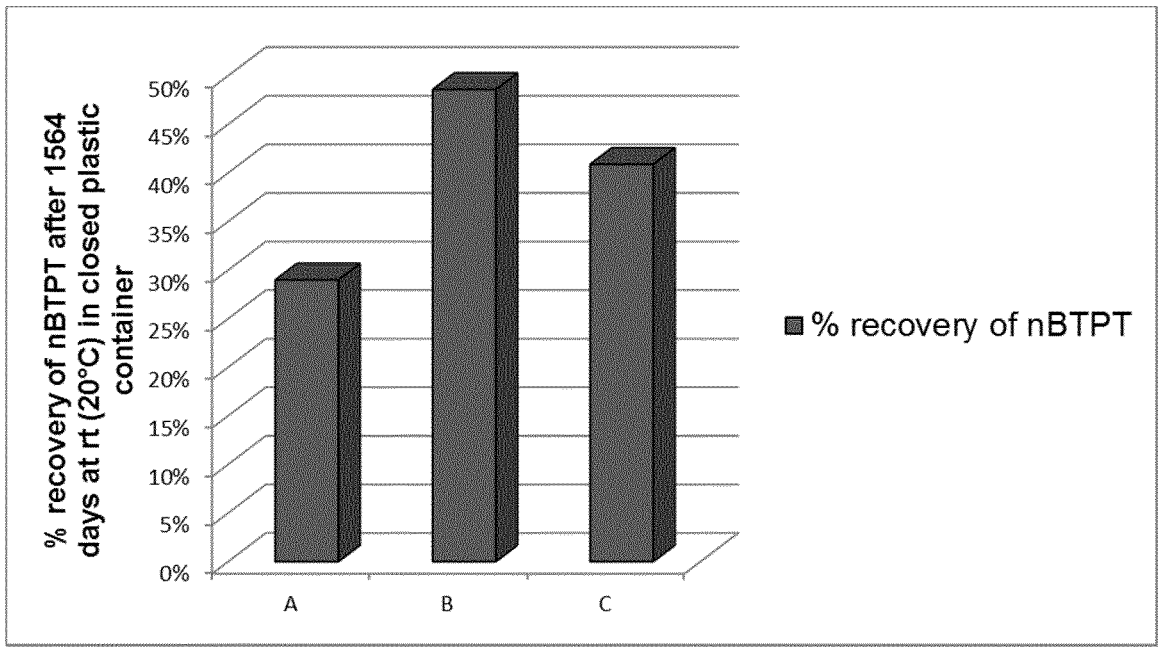
FIG. 3: Stability of nBTPT in urea with storage in closed plastic containers at room temperature (20° C.) for 1564 days (>4 years). {A=500 ppm nBTPT powder in [urea+500 ppm NaOH], B=500 ppm nBTPT powder in [urea+1% CaO], C=500 ppm nBTPT powder in [urea+1% $CaCO_3$]}.

On top of that, the granules were also stored for 1564 days (more than 4 years!) at room temperature (20° C.) in closed plastic containers and the decomposition of nBTPT was followed. The results are shown in FIG. 3. FIG. 1 showed the positive effect of NaOH on the stability of nBTPT in urea. Now, FIG. 3 shows that 1% CaO or 1% $CaCO_3$ results in an even higher stability of nBTPT in urea. With the addition of 1% CaO or $CaCO_3$ a recovery of nBTPT higher than 40% was found after a long storage period of more than 4 years at room temperature.

Figure 4:
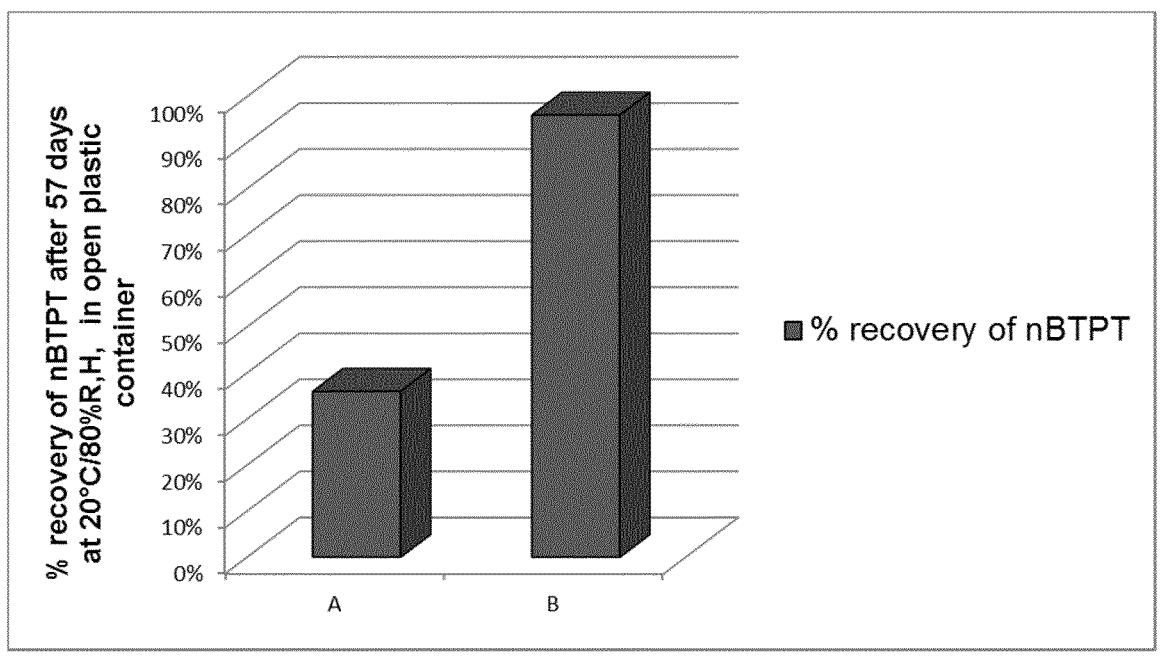
FIG. 4: Stability of nBTPT in urea with storage in plastic containers open to air at 20° C. and a relative humidity of 80%. {A=500 ppm nBTPT powder in urea, B=600 ppm nBTPT powder in [urea+0.1% B as Borax]}.

In a third experiment, 500 ppm nBTPT powder was added into a urea melt, with and/or without the presence of 0.1% B as borax, and in a next step this melt composition was converted into urea granules in a fluidized bed granulator. Subsequently, the granules were stored for 57 days at 20° C./80% R.H. in open plastic containers and the decomposition of nBTPT was followed. The results are shown in FIG. 4. The addition of 0.1% B as borax seems to have a big positive effect on the stability of nBTPT in urea granules during storage.

Figure 5:
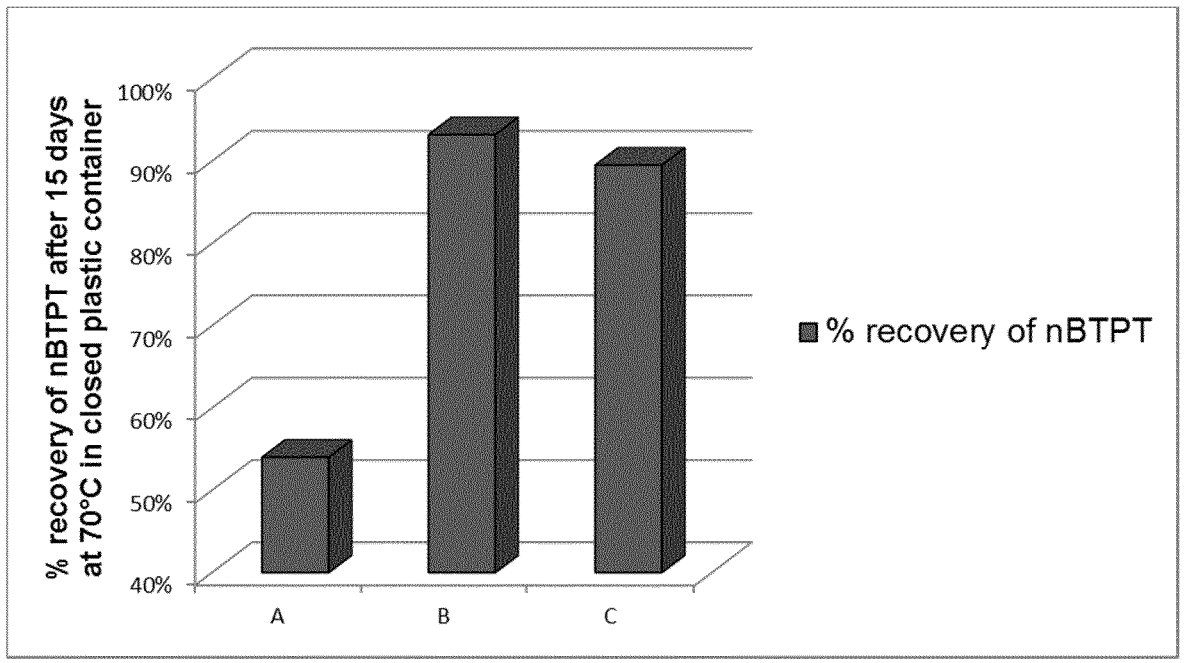
FIG. 5: Stability of nBTPT in urea with storage in closed plastic containers at 70° C. for 15 days. {A=600 ppm nBTPT powder in urea, B=600 ppm nBTPT powder in [urea+1% CaO], C=600 ppm nBTPT powder in [urea+1% $CaCO_3$]}.

In a fourth experiment, 600 ppm nBTPT powder was added into a urea melt, with and/or without the presence of an alkaline stabilizer, and in a next step this melt composition was converted into urea granules in a fluidized bed granulator. Subsequently, the granules were stored for 15 days at 70° C. in closed plastic containers and the decomposition of nBTPT was followed. The results are shown in FIG. 5. The addition of 1% CaO and $CaCO_3$ seems to have a big positive effect on the stability of nBTPT in urea granules during storage.

Example 2—nBTPT on Urea

This example shows the positive effect of several alkaline stabilizers, added on urea granules, on the stability of nBTPT on urea.

600 ppm nBTPT powder was mixed with and/or without the presence of an alkaline stabilizer and subsequently added on urea granules, which were moisturized from 0.20% $H_2O$ to 0.60% $H_2O$. This moisturization was done to create a higher moisture level of the urea granules to simulate moisture take up during storage in market conditions.

Figure 6:
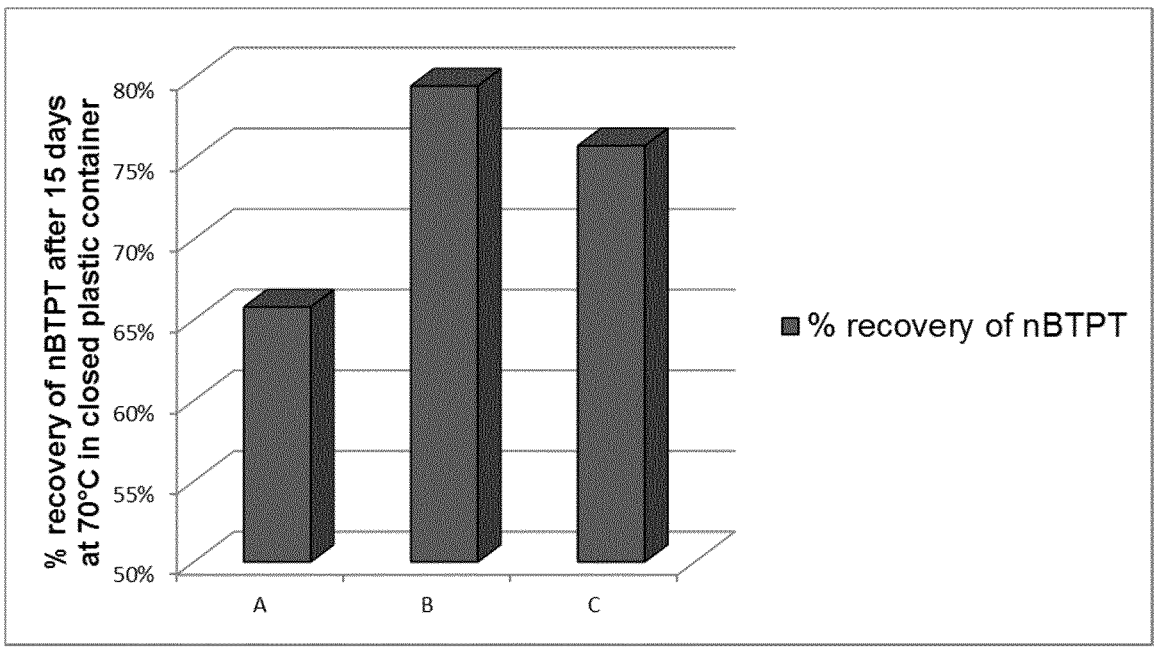
FIG. 6: Stability of nBTPT on urea, which was moisturized with 0.20% to 0.60% $H_2O$, with storage in closed plastic containers at 70° C. for 15 days. {A=600 ppm nBTPT powder on urea, B=[600 ppm nBTPT powder+2600 ppm MgO] on urea, C=[600 ppm nBTPT powder+6000 ppm $CaCO_3$] on urea}.

Subsequently, the urea granules were stored for 15 days at 70° C. in closed plastic containers and the decomposition of nBTPT was followed. The results are shown in FIG. 6. The addition of MgO and CaCO₃ seems to have a positive effect on the stability of nBTPT on urea granules during storage.

Example 3—nBTPT in Solution

In contrast to the addition of alkalines in and on urea, this example shows the negative effect of several alkaline stabilizers on the stability of nBTPT in solution.

Figure 7:
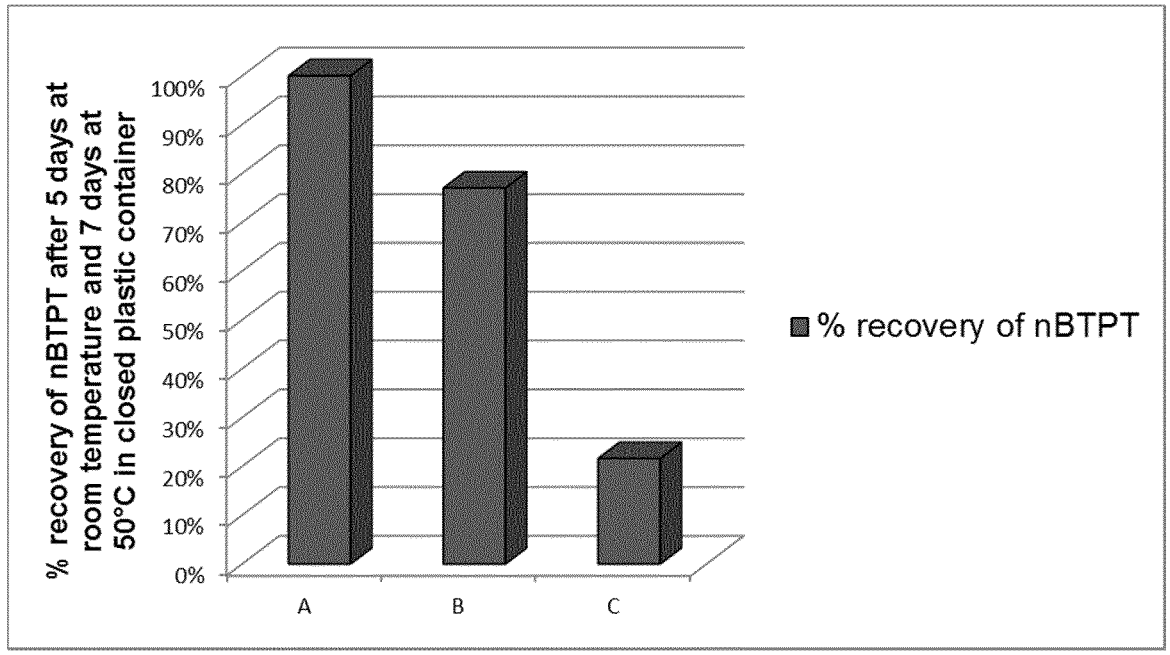
FIG. 7: Stability of nBTPT in a concentration of 17.5% in propylene glycol (PG) with and without the addition of an alkaline compound with storage in closed plastic containers for 5 days at room temperature (20° C.) and subsequently 7 days at 50° C. {A=17.5% nBTPT in PG, B=17.5% nBTPT in PG+5% CaO, C=17.5% nBTPT in PG+5% NaOH}.

In a first experiment, a solution of 17.5% nBTPT in PG was made and in a next step an alkaline compound was added. Subsequently, the solutions were stored in closed plastic containers for 5 days at room temperature (20° C.) and subsequently 7 days at 50° C. and the decomposition of nBTPT was followed. The results are shown in FIG. 7. The addition of CaO and NaOH seems to have a negative effect on the stability of nBTPT in solution.

Figure 8:
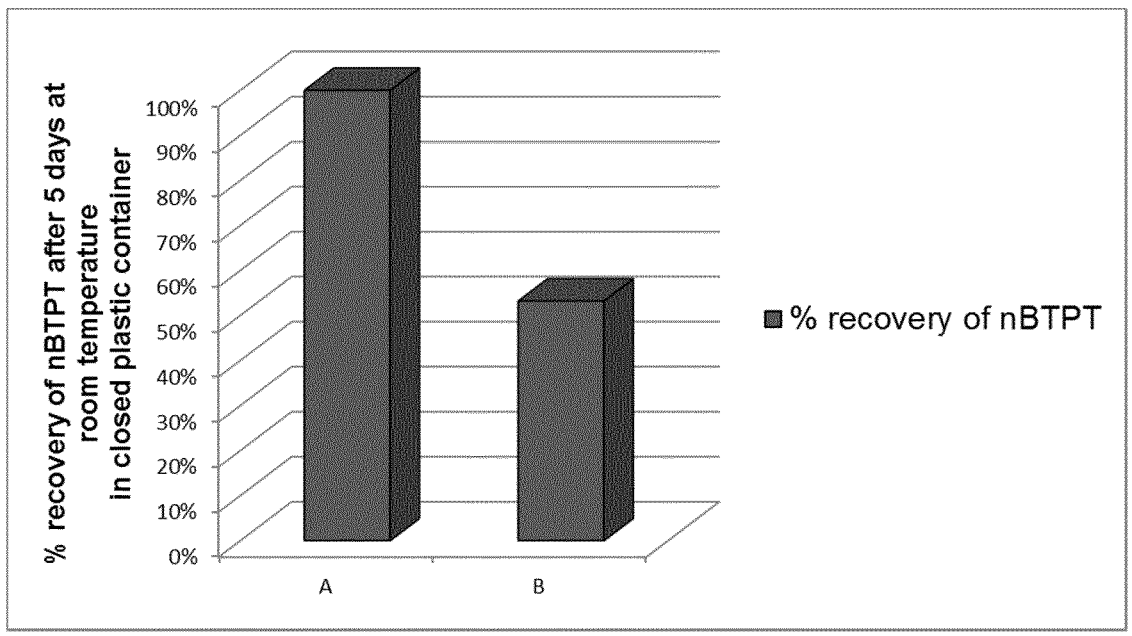
FIG. 8: Stability of nBTPT in Agrotain® Ultra with and without the addition of an alkaline compound with storage in closed plastic containers for 5 days at room temperature (20° C.) {A=Agrotain® Ultra, B=Agrotain® Ultra+5% NaOH}.

In a second experiment, an alkaline compound was added to Agrotain® Ultra. Subsequently, the nBTPT solutions were stored in closed plastic containers for 5 days at room temperature (20° C.) and the decomposition of nBTPT was followed. The results are shown in FIG. 8. The addition of NaOH seems to have a negative effect on the stability of nBTPT in Agrotain® Ultra.

Figure 9:
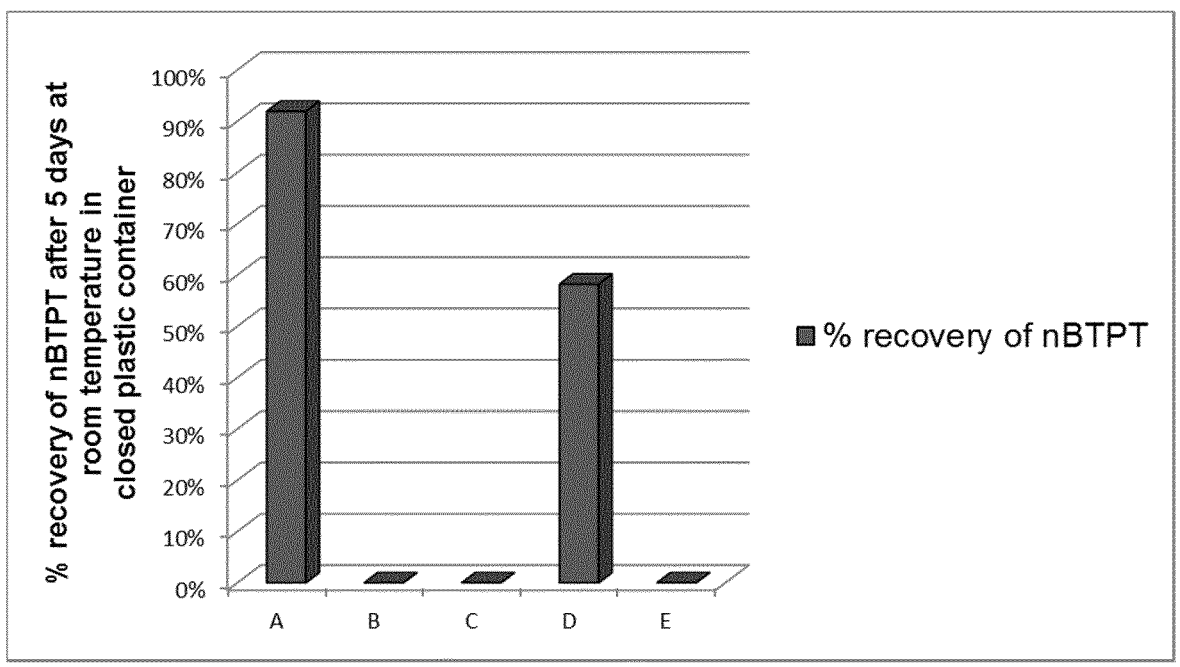
FIG. 9: Stability of nBTPT in an aqueous solution (3 g nBTPT/L water) with and without the addition of an alkaline compound with storage in closed plastic containers for 5 days at room temperature (20° C.). {A=3 g nBTPT/L water, B=3 g nBTPT/L water+1% NaOH, C=3 g nBTPT/L water+1% CaO, D=3 g nBTPT/L water+1% Na—$HCO_3$, E=3 g nBTPT/L water+1% $Na_2CO_3$}.

In a third experiment, an aqueous solution of 3.0 g nBTPT in 1 L water was made and in a next step an alkaline compound was added. Subsequently, the aqueous solutions were stored in closed plastic containers for 5 days at room temperature (20° C.) and the decomposition of nBTPT was followed. The results are shown in FIG. 9. The addition of CaO, NaOH, NaHCO₃ and Na₂CO₃ seems to have a negative effect on the stability of nBTPT in solution.

The invention claimed is:

1. A solid, particulate, urea-based composition comprising urea in particulate form, and a phosphoric triamide urease inhibitor, wherein the urea-based composition is further characterized in that it comprises 0.0001 to 5 weight %, relative to the total weight of the composition, of one or more alkaline or alkaline-forming inorganic compounds, wherein:
   the solid, particulate, urea-based composition is a homogeneous composition, or
   the phosphoric triamide urease inhibitor and the one or more alkaline or alkaline-forming inorganic compounds are present as coating on the urea in particulate form.

2. The urea-based composition according to claim 1, wherein the alkaline-forming or alkaline inorganic compound is selected from the group consisting of metal oxides, carbonates, hydroxides, acetates, and any mixture thereof.

3. The urea-based composition according to claim 2, wherein the alkaline-forming or alkaline compound is selected from the group consisting of calcium oxide, sodium hydroxide, sodium hydrogen carbonate, sodium carbonate, borax, zinc oxide, magnesium oxide, calcium carbonate, and any mixture thereof.

4. The urea-based composition according to claim 1, further comprising an anti-caking and/or moisture repellent and/or anti-dust coating, applied onto the particulate components of the urea-based composition, wherein the coating comprises at least a non-polar material and is present in the composition at a level of 0.0001 to 1 weight % relative to the total weight of the composition.

5. The urea-based composition according to claim 4, wherein the coating comprises at least a non-polar material, being a liquid organic material selected from the group consisting of an oil, wax, resin and any mixture thereof and is present in the composition at a level of 0.0001 to 1 weight %, relative to the total weight of the composition.

6. The urea-based composition according to claim 1, wherein the urea-based composition further comprises one of more further compounds, selected from the group consisting of ammonium nitrate, calcium nitrate, calcium ammonium nitrate, sodium nitrate, ammonium sulphate nitrate, potassium ammonium nitrate, ammonium phosphate, mono-ammonium phosphate (MAP) and di-ammonium phosphate (DAP), calcium bis(dihydrogen orthophosphate), super phosphate, triple superphosphate, rock phosphate, potassium sulphate, potassium magnesium sulphate, ammonium sulphate (AS), potassium chloride (MOP), and mixtures thereof.

7. The urea-based composition according to claim 6, wherein the urea-based compound and/or the further compound is present in an amount that ranges from about 0 to 60 weight %.

8. The urea-based composition according to claim 1, characterized in that the average particle size (dp50) of the urea in particulate form is between 1.0 mm and 5 cm, as determined by mesh sieve screening.

9. The urea-based composition according to claim 1, characterized in that it further comprises an anti-caking and/or moisture repellent and/or anti-dust coating.

10. The urea-based composition according to claim 1, characterized in that the phosphoric triamide urease inhibitor is a compound of formula:

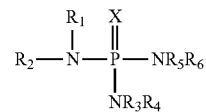

wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl; or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
$R_3$, $R_4$, $R_5$ and $R_6$ are individually hydrogen or alkyl having 1 to 6 carbon atoms.

11. The urea-based composition according to claim 1, wherein the phosphoric triamide urease inhibitor is N-(n-butyl) thiophosphoric triamide (nBTPT).

12. The urea-based composition according to claim 1, wherein the phosphoric triamide urease inhibitor is present at a level of 0.0001 to 1% weight % relative to the total weight of the urea-based composition.

13. The urea-based composition according to claim 1, wherein the alkaline-forming or alkaline compound is present in the composition at a level of 0.02 to 1 weight % relative to the total weight of the composition.

14. The urea-based composition according to claim 1, wherein the weight ratio of phosphoric triamide urease inhibitor to one or more alkaline or alkaline-forming inorganic compounds ranges from 1:20 to 1:1.

15. The urea-based composition according to claim 1, wherein the urea-based composition is packaged without the presence of a head space.

16. The urea-based composition according to claim 1, wherein the urea-based composition further comprises one of more urea-based compounds, selected from the group consisting of urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), urea-based NPK's, and mixtures thereof.

17. The urea-based composition according to claim 1, wherein the composition contains:
- 40 to 99 weight % of urea in particulate form;
- 0 to 60 weight % of one or more compounds in particulate form, selected from the group consisting of urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), urea-based NPK's, ammonium nitrate, calcium nitrate, calcium ammonium nitrate, sodium nitrate, ammonium sulphate nitrate, potassium ammonium nitrate, ammonium phosphate, mono-ammonium phosphate (MAP) and di-ammonium phosphate (DAP), calcium bis(dihydrogen orthophosphate), super phosphate, triple superphosphate, rock phosphate, potassium sulphate, potassium magnesium sulphate, ammonium sulphate (AS), potassium chloride (MOP), and mixtures thereof;
- 0.0001 to 1 weight % of a phosphoric triamide urease inhibitor;
- 0.0001 to 5 weight % of one or more alkaline or alkaline-forming inorganic compounds;
- 0 to 1 weight % of an anti-caking and/or moisture repellent and/or anti-dust coating;
- adding up to 100 weight %, being the total weight of the composition.

18. The urea-based composition according to claim 1, wherein the phosphoric triamide urease inhibitor is N-(n-butyl) thiophosphoric triamide (nBTPT) in solid particulate form.

19. A fertilizer comprising the solid, particulate urea-based composition as claimed in claim 1.

20. The fertilizer according to claim 19 for supporting the growth of agricultural products on a sulphur-deficient soil, a phosphor-deficient soil and/or a potassium-deficient soil.

21. An animal feed comprising the solid, particulate urea-based composition as claimed in claim 1.

22. A method for the manufacture of a solid, particulate, urea-based composition according to claim 1, the method comprising the steps of:
1) providing a urea material;
2) melt-mixing the urea material with a phosphoric triamide urease inhibitor in solid particulate or liquid form and 0.0001 to 5 weight %, relative to the total weight of the composition, of an amount of one or more alkaline or alkaline-forming inorganic compounds;
3) optionally providing a particulate material, comprising one or more compounds selected from the group consisting of urea-based compounds and/or further compounds selected from the group consisting of urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), urea-based NPK's, ammonium nitrate, calcium nitrate, calcium ammonium nitrate, sodium nitrate, ammonium sulphate nitrate, potassium ammonium nitrate, ammonium phosphate, mono-ammonium phosphate (MAP) and di-ammonium phosphate (DAP), calcium bis(dihydrogen orthophosphate), super phosphate, triple superphosphate, rock phosphate, potassium sulphate, potassium magnesium sulphate, ammonium sulphate (AS), potassium chloride (MOP), and mixtures thereof;
4) melt-mixing the materials obtained in steps 2) and 3);
5) optionally, applying a coating to one or more of the particulate compounds, wherein the coating that is able to increase at least the anticaking and/or water repellence and/or anti-dust properties of said urea-based composition.

23. The method according to claim 22, wherein the phosphoric triamide urease inhibitor is N-(n-butyl) thiophosphoric triamide (nBTPT).

24. Method for improving the stability of a phosphoric triamide urease inhibitor in a solid, particulate, urea-based composition comprising urea in particulate form and said phosphoric triamide urease inhibitor, comprising the steps of:
a) applying to the composition of 0.0001 to 5 weight %, relative to the total weight of the composition, of one or more alkaline or alkaline-forming inorganic compounds as a coating; and optionally
b) application of an anticaking and/or moisture repellent coating onto said urea-based composition.

* * * * *